United States Patent [19]
Neithamer

[11] Patent Number: 5,721,183
[45] Date of Patent: Feb. 24, 1998

[54] CATALYST SYSTEM COMPRISING AMINE OR PHOSPHINE ADDUCTS OF TRIS (ORGANYL)BORANE COMPOUNDS

[75] Inventor: David R. Neithamer, Midland, Mich.

[73] Assignee: The Dow Chemical Company, Midland, Mich.

[21] Appl. No.: 402,436

[22] Filed: Mar. 10, 1995

[51] Int. Cl.$^6$ .............................. B01J 31/00; B01J 37/00; C08F 4/02; C08F 4/60

[52] U.S. Cl. .................. 502/103; 502/117; 502/121; 502/123; 502/124; 502/202; 526/160; 526/943

[58] Field of Search ............................... 502/102, 103, 502/118, 121, 123, 124, 202; 564/8, 9; 568/2

[56] References Cited

U.S. PATENT DOCUMENTS

| | | | |
|---|---|---|---|
| 3,275,611 | 9/1966 | Mottus et al. | 260/80.5 |
| 5,064,802 | 11/1991 | Stevens et al. | 502/155 |
| 5,106,928 | 4/1992 | Skoultchi et al. | 526/196 |
| 5,296,433 | 3/1994 | Siedle et al. | 502/117 |
| 5,372,682 | 12/1994 | Devore et al. | 556/53 |
| 5,376,746 | 12/1994 | Skoultchi | 564/9 |
| 5,391,661 | 2/1995 | Naganuma et al. | 502/102 |
| 5,447,895 | 9/1995 | Marks et al. | 502/202 |
| 5,470,993 | 11/1995 | Devore et al. | 502/103 |
| 5,502,017 | 3/1996 | Marks et al. | 502/103 |
| 5,596,054 | 1/1997 | Takeuchi | 502/103 |

FOREIGN PATENT DOCUMENTS

| | | |
|---|---|---|
| 0416815 | 3/1991 | European Pat. Off. . |
| 0520732 | 12/1992 | European Pat. Off. . |
| 5-301919 | 11/1993 | Japan . |
| 7-76605 | 3/1995 | Japan . |
| 7-90009 | 4/1995 | Japan . |
| 7-157512 | 6/1995 | Japan . |
| 763358 | 9/1980 | U.S.S.R. ............ 502/102 |
| WO 96/16094 | 5/1996 | WIPO . |

OTHER PUBLICATIONS

Ewen, et al. J. Am. Chem. Soc., 110, 6255–6256 (1980).
Wild et al., J. Organomet. Chem., 232, 233–47 (1982).

Primary Examiner—Glenn Caldarola
Assistant Examiner—J. Pasterczyk

[57] ABSTRACT

Compositions of matter useful as addition polymerization catalysts comprising a Group 4 metal complex and an adduct of tris(organyl)borane compound with a non-tertiary amine or non-tertiary phosphine compound.

8 Claims, No Drawings

CATALYST SYSTEM COMPRISING AMINE OR PHOSPHINE ADDUCTS OF TRIS (ORGANYL)BORANE COMPOUNDS

BACKGROUND OF THE INVENTION

This invention relates to catalyst systems comprising an adduct of a tris(organyl)borane compound with an amine or phosphine, and a Group 3, 4, or Lanthanide metal complex. These catalyst systems have been found to be extremely useful for the polymerization of one or more addition polymerizable monomers, especially one or more α-olefins under Ziegler-Natta polymerization conditions.

In U.S. Pat. No. 5,296,433, borane complexes with water, alcohols, mercaptans, silanols, oximes and mixtures thereof (or of acidic salts of their conjugate bases) with Group 4 organometallic compounds, especially metallocene compounds, were disclosed as being useful as olefin polymerization catalysts.

In U.S. Ser. No. 545,403, filed Jul. 3, 1990, (published in equivalent form Mar. 13, 1991 as EP-A-416,815), now U.S. Pat. No. 5,618,277, there are disclosed certain constrained geometry metal complexes and catalysts derived by reacting the metal complex with activating cocatalysts. In U.S. Pat. No. 5,064,802 (published Mar. 20, 1991 in equivalent form as EP-A-418,044) there are disclosed certain further constrained geometry metal catalysts formed by reacting such metal complexes with salts of Bronsted acids containing a non-coordinating compatible anion. The reference discloses the fact that such complexes are usefully employed as catalysts in addition polymerizations. In U.S. Ser. No. 876,268, filed May 1, 1992 (published in equivalent form Dec. 30, 1992 as EP-A-520,732), now allowed, an alternative technique for preparing cationic constrained geometry catalysts using borane activator compounds is disclosed. For the teachings contained therein, the foregoing United States patent and applications are herein incorporated by reference.

It would be desirable if there were provided an improved method of catalyst activation that would allow the production of even more efficient Group 3, 4 or Lanthanide metal catalysts as well as an improved addition polymerization process utilizing such catalysts.

SUMMARY OF THE INVENTION

As a result of investigations carried out by the present inventor there is now discovered a new and improved catalyst system comprising:

a) at least one metal complex corresponding to the formula: $K'_kMZ'_mL_nX_e$, or a dimer thereof wherein:

K is an anionic, group comprising delocalized π-electrons through which K' is bound to M, containing up to 50 nonhydrogen atoms, optionally two L groups may be joined together forming a bridged structure, and further optionally one K may be bound to Z;

M is a Group 3, 4 or Lanthanide metal in the +2, +3 or +4 formal oxidation state;

Z is an optional, divalent substituent of up to 50 non-hydrogen atoms that together with K forms a metallocycle with M;

L' is an optional neutral Lewis base having up to 20 non-hydrogen atoms;

X independently each occurrence is a monovalent, anionic moiety other than a delocalized, π-bonded group, said X having up to 40 non-hydrogen atoms, or two X groups may be covalently bound together forming a divalent dianionic moiety having both valences bound to M, or one or more L and one or more L groups may be bound together thereby forming a moiety that is both covalently bound to M and coordinated thereto by means of Lewis base functionality;

k is 1 or 2;

m is 0 or 1;

n is a number from 0 to 3;

p is an integer from 0 to 3; and the sum, k+m+p, is equal to the formal oxidation state of M, and b) at least one activating cocatalyst comprising an adduct of a tris(organyl)borane and a non-tertiary amine or non-tertiary phosphine compound corresponding to the formula:

$(Pf)_3B\cdot HJG_2$, wherein,

Pf independently each occurrence is a fluorinated hydrocarbyl group,

J is nitrogen or phosphorus, and

G, independently each occurrence is hydrogen, hydrocarbyl, halogenated hydrocarbyl, silyl, or a mixture thereof, said G having up to 20 nonhydrogen atoms;

the molar ratio of a) to b) being from 1:10,000 to 100:1.

Also included within the present invention is a process for forming a catalyst system comprising contacting the foregoing components a) and b) in an inert diluent, optionally in the presence of one or more addition polymerizable monomers.

Additionally there is provided an improved method for polymerization of addition polymerizable monomers using the above catalyst system alone or in combination with another catalyst system. Such addition polymerization processes are particularly desirable for use to prepare homopolymers or copolymers of one or more $C_{2-20}$ α-olefins, for use in molding, film, sheet, extrusion foaming and other applications.

DETAILED DESCRIPTION

All reference to the Periodic Table of the Elements herein shall refer to the Periodic Table of the Elements, published and copyrighted by CRC Press, Inc., 1989. Also, any reference to a Group or Groups shall be to the Group or Groups as reflected in this Periodic Table of the Elements using the IUPAC system for numbering groups.

Preferred borane adducts for use in forming the activating cocatalysts of the invention are those wherein Pf is pentafluorophenyl, 2,3,5,6-tetrafluorophenyl, 2,3,4,5-tetrafluorophenyl, 3,4,5-trifluorophen-1-yl, or 4-(pentafluorophenyl)-2,3,5,6-tetrafluorophenyl. Preferred tris(organyl)borane adducts are derivatives of tris(pentafluorophenyl)borane.

Highly suitably, G in the amine or phosphine compound independently each occurrence is hydrogen or a $C_{1-10}$ hydrocarbyl or halohydrocarbyl group. Preferably, G is independently each occurrence hydrogen, $C_{1-4}$ alkyl, phenyl or pentafluorophenyl.

The adducts of the tris(organyl)borane and the non-tertiary amine or phosphine compound are readily prepared by combining the compounds in an inert diluent such as aliphatic or aromatic hydrocarbons. Large excesses of either reactant may be employed; however preferably the two reactants are combined in a molar ratio of 0.5:1 to 1:5, more preferably 0.95:1 to 1:1.25, and most preferably 1:1. The reaction can be conducted at any convenient temperature.

Preferred temperatures are from −78° to +150 °C. The adducts may be recovered if desired or further contacted with the Group 3, 4 or Lanthanide metal compound to form the active catalyst system. Such contacting may take place in situ in the polymerization reactor used for the subsequent polymerization. One or more polymerizable monomers may also be present at the time of the in situ addition.

Turning once again to the metal containing complexes of the present catalyst system, suitable K groups for use herein include any n-electron containing moiety capable of forming a delocalized bond with the Group 3, 4 or Lanthanide metal. Examples include conjugated or nonconjugated dienyl groups (including cyclic dienyl groups), allyl groups, as well as substituted derivatives of such groups.

By the term "derivative" when used to describe the above substituted, delocalized n-bonded groups is meant that each atom in the delocalized n-bonded group may independently be substituted with a radical selected from the group consisting of halogen, hydrocarbyl, halohydrocarbyl, and hydrocarbyl-substituted metalloid radicals wherein the metalloid is selected from Group 14 of the Periodic Table of the Elements. Included within the term "hydrocarbyl" are $C_{1-20}$ straight, branched and cyclic alkyl radicals, $C_{6-20}$ aromatic radicals, $C_{7-20}$ alkyl-substituted aromatic radicals, and $C_{7-20}$ aryl-substituted alkyl radicals. In addition two or more such radicals may together form a fused ring system or a hydrogenated fused ring system. Examples of the latter are indenyl-, tetrahydroindenyl-, fluorenyl-, and octahydrofluorenyl- groups. Suitable hydrocarbyl-substituted organometalloid radicals include mono-, di- and trisubstituted organometalloid radicals of Group 14 elements wherein each of the hydrocarbyl groups contains from 1 to 20 carbon atoms. More particularly, suitable hydrocarbyl-substituted organometalloid radicals include trimethylsilyl, triethylsilyl, ethyldimethylsilyl, methyldiethylsilyl, triphenylgermyl, trimethylgermyl and the like.

Suitable complexes include those containing either one or two K groups. The latter complexes include those containing a bridging group linking the two K groups. Preferred bridging groups are those corresponding to the formula $(ER_2)_x$ wherein E, independently each occurrence, is silicon or carbon, $R^2$ independently each occurrence is hydrogen or a group selected from silyl, hydrocarbyl and combinations thereof, said $R^2$ having up to 30 carbon or silicon atoms, and x is 1 to 8. Preferably, R" independently each occurrence is methyl, benzyl, tert-butyl or phenyl.

Such bridged structures are especially suited for the preparation of polymers having stereoregular molecular structure. In such capacity it is preferred that the complex possess $C_s$ symmetry or possess a chiral, stereorigid structure. Examples of the first type are compounds possessing different delocalized π-bonded systems, such as one cyclopentadienyl group and one fluorenyl group. Similar systems based on Hf(IV) or Zr(IV) were disclosed for preparation of syndiotactic olefin polymers in Ewen, et al., *J. Am. Chem. Soc.* 110, 6255–6256 (1980). Examples of chiral structures include bis-indenyl complexes. Similar systems based on Ti(IV) or Zr(IV) were disclosed for preparation of isotactic olefin polymers in Wild et al., *J. Organomet. Chem*, 232, 233–47, (1982).

Exemplary bridged cyclopentadienyl moieties include: (dimethylsilyl-bis-cyclopentadienyl), (dimethylsilyl-bis-methylcyclopentadienyl), (dimethylsilyl-bis-ethylcyclopentadienyl, (dimethylsilyl-bis-t-butylcyclopentadienyl), (dimethylsilyl-bis-tetramethylcyclopentadienyl), (dimethylsilyl-bis-indenyl), (dimethylsilyl-bis-tetrahydroindenyl), (dimethylsilyl-bis-fluorenyl), (dimethylsilyl-bis-tetrahydrofluorenyl), (dimethylsilyl-cyclopentadienyl-fluorenyl), (1,1,2,2-tetramethyl-1,2-disilyl-bis-cyclopentadienyl), (1, 2-bis (cyclopentadienyl)ethane, and (isopropylidene-cyclopentadienylfluorenyl).

Preferred K groups include allyl, cyclopentadienyl and substituted cyclopentadienyl groups. Especially preferred K groups are cyclopentadienyl, indenyl, fluorenyl, tetrahydroindenyl, tetrahydrofluorenyl, octahydrofluorenyl, pentadienyl, cyclohexadienyl, dihydroanthracenyl, hexahydroanthracenyl, decahydroanthracenyl, and methyl-substituted derivatives of such groups.

Suitable divalent X substituents preferably include groups containing up to 30 nonhydrogen atoms comprising at least one atom that is oxygen, sulfur, boron or a member of Group 14 of the Periodic Table of the Elements directly attached to the delocalized π-bonded group, and a different atom, selected from the group consisting of nitrogen, phosphorus, oxygen or sulfur that is covalently bonded to M.

Suitable L' groups include ethers, especially diethylether, 1,2-dimethoxyethane (DME), and tetrahydrofuran (THF) and conjugated or nonconjugated dienes able to form a delocalized n-bond to M, especially, 1,4-diphenyl-1,3-butadiene, 1,3-pentadiene, 1,4-dibenzyl-1,3-butadiene, 2,4-hexadiene, 3-methyl-1,3-pentadiene, 1,4-ditolyl-1,3-butadiene, or 1,4-bis(trimethylsilyl)-1,3-butadiene. When such diene ligands are present, M is in the +2 formal oxidation state, and p is 0. A method for determining the formal oxidation state of the metal in diene complexes is disclosed in copending application Ser. No. 08/241,523, filed May 12 1994, now U.S. Pat. No. 5,476,493, the teachings of which are herein incorporated by reference.

Preferred X groups are selected from hydride, hydrocarbyl, silyl, germyl, halohydrocarbyl, halosilyl, silylhydrocarbyl and aminohydrocarbyl groups, or two X groups together with M form a metallocyclopentene. Most preferred X groups are $C_{1-20}$ hydrocarbyl groups.

Preferably the metal complexes utilized in the present invention correspond to the formula:

or a dimer thereof
wherein:

K is a cyclic, anionic, group that comprises delocalized π-electrons through which K' is bound to M, containing up to 50 nonhydrogen atoms;

M is a metal of Group 4 of the Periodic Table of the Elements in the +2, +3 or +4 formal oxidation state;

Z is a divalent substituent of up to 50 non-hydrogen atoms that together with K forms a metallocycle with M;

L is an optional neutral Lewis base ligand having up to 20 non-hydrogen atoms;

X independently each occurrence is a monovalent, anionic moiety other than a delocalized, n-bonded group, said X having up to 30 non-hydrogen atoms, or two X groups may be covalently bound together forming a divalent dianionic moiety having both valences bound to M, or one or more X and one or more L groups may be together thereby forming a moiety that is both covalently bound to M and coordinated thereto by means of Lewis base functionality;

k is 1 or 2;

m is 0 or 1, and the sum k+m=2;

n is a number from 0 to 3;

p is an integer from 0 to 2; and the sum, k+m+p, is equal to the formal oxidation state of M.

Highly preferred Group 4 metal complexes for use in formation of the catalyst systems of the invention are those containing one and only one cyclic, delocalized, anionic, π-bonded group, said complexes corresponding to the formula:

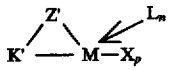

wherein:

K is a cyclic, anionic, group that comprising delocalized π-electrons through which K' is bound to M, containing up to 50 nonhydrogen atoms;

M is a Group 4 metal,

Z is a divalent substituent of up to 50 non-hydrogen atoms that together with K forms a metallocycle with M;

L is an optional neutral Lewis base ligand having up to 20 non-hydrogen atoms;

X independently each occurrence is a monovalent, anionic moiety other than a delocalized, n-bonded group, said X having up to 30 non-hydrogen atoms, or two X groups may be covalently bound together forming a divalent dianionic moiety having both valences bound to M, or one or more X and one or more L groups may be together thereby forming a moiety that is both covalently bound to M and coordinated thereto by means of Lewis base functionality;

n is 0 or 1;

p is an integer from 0 to 2 equal to 2 less than the formal oxidation state of M.

Such complexes are known in the art as constrained geometry complexes.

More highly preferred metal coordination complexes for use according to the present invention correspond to the formula:

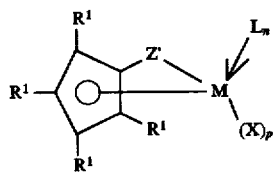

wherein

M is titanium or zirconium,

X is a divalent substituent of up to 50 non-hydrogen atoms that together with K forms a metallocycle with M;

$R^1$ each occurrence is independently selected from hydrogen, hydrocarbyl, silyl, germyl, halo, cyano, and combinations thereof, said $R^2$ having up to 20 nonhydrogen atoms, and optionally, two $R^1$ groups are joined together forming a divalent derivative thereof connected to adjacent positions of the cyclopentadienyl ring;

L is an optional neutral Lewis base ligand having up to 20 non-hydrogen atoms;

X independently each occurrence is a monovalent, anionic moiety other than a delocalized, n-bonded group, said X having up to 30 non-hydrogen atoms, or two X groups may be covalently bound together forming a divalent dianionic moiety having both valences bound to M, or one or more X" and one or more L groups may be together thereby forming a moiety that is both covalently bound to M and coordinated thereto by means of Lewis base functionality;

n is 0 or 1; and p is an integer from 0 to 2 equal to 2 less than the formal oxidation state of M.

Most highly preferred Group 4 metal coordination complexes used according to the present invention correspond to the formula:

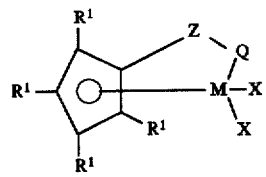

wherein:

M is titanium or zirconium in the +4 formal oxidation state;

$R^1$ each occurrence is independently selected from hydrogen, hydrocarbyl, silyl, germyl, halo, cyano, and combinations thereof, said $R^1$ having up to 20 nonhydrogen atoms, and optionally, two $R^1$ groups are joined together forming a divalent derivative thereof connected to adjacent positions of the cyclopentadienyl ring;

X" is hydride, halo, or a hydrocarbyl, hydrocarbyloxy or silyl group, said group having up to 20 nonhydrogen atoms;

Q is —O—, —S—, —$NR^4$—, or —$PR^4$; and

Z is $SiR_2^4SiR_2^4$, $CR_2^4CR_2^4$, $CR^4=CR^4$, $CR_2^4SiR_2^4$, or $GeR^{z4}$ wherein:

$R^4$ each occurrence is independently hydrogen, or a member selected from hydrocarbyl, silyl, halogenated alkyl, halogenated aryl, and combinations thereof, said $R^4$ having up to 10 non-hydrogen atoms, and optionally, two $R^4$ groups from Z, or an $R^4$ group from Z and an $R^4$ group from Y are joined together to form a ring system.

Further in such most highly preferred embodiment, $R^1$ independently each occurrence is hydrogen, hydrocarbyl, silyl, halo or a combination thereof, said $R^1$ having up to 10 non-hydrogen atoms, or two $R^1$ groups are joined together forming a divalent derivative thereof; most preferably, $R^1$ is hydrogen, methyl, ethyl, propyl, butyl, pentyl, hexyl, (including where appropriate all isomers), cyclopentyl, cyclohexyl, norbornyl, benzyl, or phenyl or two $R^1$ groups are joined together, the entire $C_5R_4^1$ group thereby being, for example, an indenyl, tetrahydroindenyl, fluorenyl, tetrahydrofluorenyl, or octahydrofluorenyl group.

Further most highly preferably, at least one of $R^1$ or $R^4$ is an electron donating moiety. By the term "electron donating" is meant that the moiety is more electron donating than hydrogen. Also most highly preferably, Q is a nitrogen or phosphorus containing group corresponding to the formula —$N(R^3)$— or —$P(R^3)$—, wherein $R^3$ is $C_{1-10}$ hydrocarbyl.

Examples of the above most highly preferred metal coordination compounds include compounds wherein the R'" on the amido or phosphido group is methyl, ethyl, propyl, butyl, pentyl, hexyl, (including branched and cyclic isomers), norbornyl, benzyl, or phenyl; the $C_5R_4^1$ group is cyclopentadienyl, tetramethylcyclopentadienyl, indenyl, tetrahydroindenyl, fluorenyl, tetrahydrofluorenyl, octahydrofluorenyl, or one of the foregoing groups further substituted with one or more methyl, ethyl, propyl, butyl, pentyl, hexyl, (including branched and cyclic isomers), norbornyl, benzyl, or phenyl groups; and X" is methyl, ethyl, neopentyl, trimethylsilyl, trimethylsilylmethyl, bis (trimethylsilyl)methyl, phenyl, norbornyl, benzyl, methylbenzyl, or pentafluorophenyl.

Illustrative derivatives of Group 3, 4 or Lanthanide metals that may be employed in the practice of the present invention include: hydrocarbyl-substituted monocyclopentadienyl compounds such as:
cyclopentadienylzirconiumtrimethyl,
cyclopentadienylzirconiumtriethyl,
cyclopentadienylzirconiumtripropyl,
cyclopentadienylzirconiumtriphenyl,
cyclopentadienylzirconiumtribenzyl,
cyclopentadienyltitaniumtrimethyl,
cyclopentadienyltitaniumtriethyl,
cyclopentadienyltitaniumtripropyl,
cyclopentadienyltitaniumtriphenyl,
cyclopentadienyltitaniumtribenzyl,
cyclopentadienylhafniumtri(p-tolyl),
pentamethylcyclopentadienylzirconiumtrimethyl,
pentamethylcyclopentadienylzirconiumtriethyl,
pentamethylcyclopentadienyl-zirconiumtripropyl,
pentamethylcyclopentadienyl zirconiumtriphenyl,
pentamethylcyclopentadienyl zirconiumtribenzyl,
pentamethylcyclopentadienyltitaniumtrimethyl,
indenylzirconium trimethyl,
indenylzirconium triethyl,
tetrahydroindenylzirconiumtripropyl,
indenylzirconiumtriphenyl,
indenylzirconiumtribenzyl,
indenyltitaniumtrimethyl,
indenyltitaniumtriethyl,
indenyltitaniumtripropyl,
indenyltitaniumtriphenyl,
tetrahydroindenyltitaniumtribenzyl,
cyclopentadienyltitaniumtriethyl,
pentamethylcyclopentadienyltitaniumtripropyl,
cyclopentadienyltitaniumtriphenyl,
pentamethylcyclopentadienyltitaniumtribenzyl,
pentamethylcyclopentadienylzirconiumtribenzyl,
pentamethylcyclopentadienyllanthanumdi(tris-(trimethylsilyl)methyl),
cyclopentadienyltitaniumdimethylisopropoxide,
pentamethylcyclopentadienylzirconiummethylbis (trimethylsilylmethyl),
indenyltitanium(tert-butylamino)dibenzyl,
constrained geometry complexes such as,
[(N-tert-butylamido)dimethyl($\eta^5$-cyclopentadienyl)silane] zirconiumdibenzyl,
[(N-tert-butylamido)dimethyl($\eta^5$-cyclopentadienyl)silane] zirconiumdimethyl,
[(N-tert-butylamido)dimethyl($\eta^5$-cyclopentadienyl)silane] titaniumdibenzyl,
[(N-tert-butylamido)dimethyl($\eta^5$-cyclopentadienyl)silane] titaniumdimethyl,
[(N-tert-butylamido)dimethyl(tetramethyl-$\eta^5$-cyclopentadienyl)silane]zirconiumdibenzyl,
[(N-tert-butylamido)dimethyl(tetramethyl-$\eta^5$-cyclopentadienyl)silane]zirconiumdimethyl,
[(N-tert-butylamido)dimethyl(tetramethyl-$\eta_5$-cyclopentadienyl)silane]titaniumdibenzyl,
[(N-tert-butylamido)dimethyl(tetramethyl-$\eta_5$-cyclopentadienyl)silane]titaniumdimethyl,
[(N-tert-butylamido)dimethyl($\eta_5$-indenyl)silane]-zirconiumdibenzyl,
[(N-tert-butylamido)dimethyl($\eta_5$-tetrahydroindenyl)silane] zirconiumdimethyl,
[(N-phenylamido)dimethyl(tetramethyl-$\eta^5$-cyclopentadienyl)silane]titaniumdibenzyl,
[(N-tert-butylamido)dimethyl($\eta^5$-fluorenyl)silane] titaniumdimethyl,
[(tert-butylamido)(tetramethyl-$\eta^5$-cyclopentadienyl)-1,2-ethanediyl]dimethylzirconium,
[(tert-butylamido)(tetramethyl-$\eta^5$-cyclopentadienyl)-1,2-ethanediyl]titaniumdibenzyl,
[(N-methylamido)($\eta^5$-cyclopentadienyl)-1,2-ethanediyl] zirconiumdibenzyl,
[(N-methylamido)(tetramethyl-$\eta^5$-cyclopentadienyl)-1,2-ethanediyl]titaniumdineopentyl,
[(phenylphosphido)(tetramethyl-$\eta^5$-cyclopentadienyl) methylene]titaniumdiphenyl,
[(N-tert-butylamido)(di(trimethylsilyl))(tetramethyl-$\eta^5$-cyclopentadienyl)silane]zirconiumdibenzyl,
[(N-benzylamido)(dimethyl)($\eta^5$-cyclopentadienyl)silane] titaniumdi(trimethylsilyl),
[(phenylphosphido)dimethyl(tetramethyl-$\eta^5$-cyclopentadienyl)silane]zirconiumdibenzyl,
[(N-tert-butylamido)(dimethyl)(tetramethyl-$\eta^5$-cyclopentadienyl)silane]hafniumdibenzyl,
[(tetramethyl-$\eta^5$-cyclopentadienyl)-1,2-ethanediyl] titaniumdibenzyl,
[2-$\eta^5$-(tetramethylcyclopentadienyl)-1-methyl-ethanolato-(2-)]titaniumdibenzyl,
[2-$\eta^5$-(tetramethylcyclopentadienyl)-1-methyl-ethanolato-(2-)]titaniumdimethyl,
[2-$\eta^5$-(tetramethylcyclopentadienyl)-1-methyl-ethanolato-(2-)]zirconiumdibenzyl,
[2-$\eta^5$-(tetramethylcyclopentadienyl)-1-methyl-ethanolato-(2-)]zirconiumdimethyl,
[2-[(4a, 4b, 8a, 9, 9a -$\eta$)-9H-fluoren-9-yl]cyclohexanolato (2-)]titaniumdimethyl,
[2-[(4a, 4b, 8a, 9, 9a -$\eta$)-9H-fluoren-9-yl]cyclohexanolato (2-)]titaniumdibenzyl,
[2-[(4a, 4b, 8a, 9, 9a -$\eta$)-9H-fluoren-9-yl]cyclohexanolato (2-)]zirconiumdimethyl,
[2-[(4a, 4b, 8a, 9, 9a -$\eta$)-9H-fluoren-9-yl]cyclohexanolato (2-)]zirconiumdibenzyl.

Group 4 metal coordination complexes containing 2 L groups for use according to the present process preferably correspond to the formula:

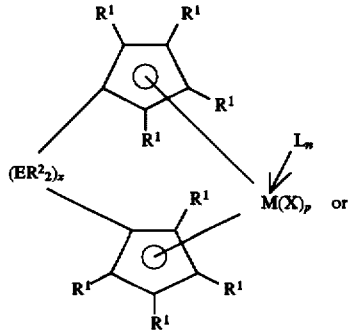

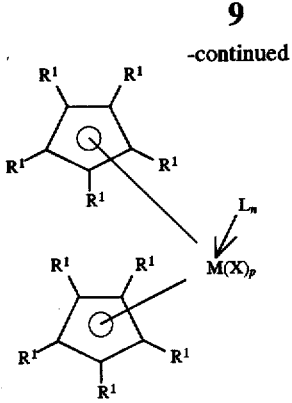

wherein:

M is zirconium or hafnium in the +2 or +4 oxidation state;

$R^2$ independently each occurrence is hydrogen or a group selected from silyl, hydrocarbyl and combinations thereof, said $R^2$ having up to 30 carbon or silicon atoms, E is silicon or carbon, x is 1 to 8, L' is an optional neutral Lewis base ligand having up to 20 non-hydrogen atoms;

X" groups are selected from hydride, hydrocarbyl, silyl, germyl, halohydrocarbyl, halosilyl, silylhydrocarbyl and aminohydrocarbyl groups, or two X" groups together with M form a metallocyclopentene, and p is 2 and n is 0 when M is in the +4 formal oxidation state and p is 0 and n is 1 when M is in the +2 formal oxidation state.

Examples of such biscyclopentadienyl compounds include:
biscyclopentadienylzirconium dimethyl,
bisindenylzirconium dimethyl,
cyclopentadienylindenylzirconium dimethyl,
methylenebis(cyclopentadienyl)zirconium dimethyl,
2,2-propenebis(cyclopentadienyl)zirconium dimethyl
silanebis(cyclopentadienyl)zirconium dimethyl, and
bispentamethylcyclopentadienylzirconium dimethyl.

Other compounds which are useful in the preparation of catalyst compositions according to this invention, especially compounds containing other Group 3, 4 or Lanthanide metals will, of course, be apparent to those skilled in the art. The components of the catalyst system are sensitive to both moisture and oxygen and should be handled and transferred in an inert atmosphere such as nitrogen, argon or helium.

The present adducts of a tris(organyl)borane compound with an amine or phosphine may be used in combination with other previously known catalyst activating compositions as well as in combinations with mixtures of previously known metal complexes to form catalyst systems according to the invention. In particular, the combination of trialkyl aluminum compounds having from 1 to 4 carbons in each alkyl group, halogenated tri(hydrocarbyl)boron compounds having from 1 to 10 carbons in each hydrocarbyl group (especially tris(pentafluorophenyl)borane), polymeric or oligomeric alumoxanes, or mixtures of the foregoing and the amine or phosphine adducts of a tris(organyl)borane compound with a metal catalyst component form especially desirable catalyst systems.

The catalyst system may be used to polymerize ethylenically and/or acetylenically unsaturated monomers having from 2 to 100,000 carbon atoms either alone or in combination. Preferred monomers include the $C_{2-20}$ α-olefins especially ethylene, propylene, isobutylene, 1-butene, 1-pentene, 1-hexene, 3-methyl-1-pentene, 4-methyl-1-pentene, 1-octene, 1-decene, long chain macromolecular α-olefins, and mixtures thereof. Other preferred monomers include styrene, $C_{1-4}$ alkyl substituted styrene, tetrafluoroethylene, vinylbenzocyclobutane, ethylidenenorbornene, 1,4-hexadiene, 1,7-octadiene, vinylcyclohexane, 4-vinylcyclohexene, divinylbenzene, and mixtures thereof with ethylene.

In general, the polymerization may be accomplished at conditions well known in the prior art for Ziegler-Natta or Kaminsky-Sinn type polymerization reactions, i.e., temperatures from 0°–250° C. and pressures from atmospheric to 1000 atmospheres (0.1 to 100 MPa). Suspension, solution, slurry, gas phase or other process conditions may be employed if desired. A support, especially silica, modified silica (silica modified by calcining, treatment with an organometallic compound, alumina, or a polymer (especially polytetrafluoroethylene or a polyolefin) may be employed, and desirably is employed when the catalysts are used in a gas phase polymerization process. The support is preferably employed in an amount to provide a weight ratio of catalyst (based on metal):support from 1:100,000 to 1:10, more preferably from 1:50,000 to 1:20, and most preferably from 1:10,000 to 1:30.

In most polymerization reactions the molar ratio of metal complex:polymerizable compounds employed is from $10^{-12}:1$ to $10^{-1}:1$, more preferably from $10^{12}:1$ to $10^{-5}:1$.

Suitable solvents for polymerization are noncoordinating, inert liquids. Examples include straight and branched-chain hydrocarbons such as isobutane, butane, pentane, hexane, heptane, octane, and mixtures thereof; cyclic and alicyclic hydrocarbons such as cyclohexane, cycloheptane, methylcyclohexane, methylcycloheptane, and mixtures thereof; perfluorinated hydrocarbons such as perfluorinated $C_{4-10}$ alkanes, and aromatic and alkyl-substituted aromatic compounds such as benzene, toluene, and xylene. Suitable solvents also include liquid olefins which may act as monomers or comonomers including ethylene, propylene, 1-butene, butadiene, cyclopentene, 1-hexene, 3-methyl-1-pentene, 4-methyl-1-pentene, 1,4-hexadiene, 1,7-octadiene, 1-octene, 1-decene, styrene, divinylbenzene, ethylidenenorbornene, allylbenzene, vinyltoluene (including all isomers alone or in admixture), 4-vinylcyclohexene, and vinylcyclohexane. Mixtures of the foregoing are also suitable.

The catalyst system may also be utilized in multiple reactions in the same or in separate reactors connected in series or in parallel optionally in combination with at least one additional homogeneous or heterogeneous polymerization catalyst to prepare polymer blends having desirable properties. In one such embodiment the procedure is analogous to the process disclosed in WO 94/00500, equivalent to U.S. Ser. No. 07/904,770, now abandoned, as well as WO 94/17112, published Aug. 4, 1994and equivalent to U.S. Ser. No. 08/10958, filed Jan. 29, 1993, now abandoned, the teachings of which are hereby incorporated by reference herein.

One such polymerization process comprises:

contacting, optionally in a solvent, one or more α-olefins with a catalyst system according to the present invention, in one or more continuous stirred tank or tubular reactors, in the presence or absence of a diluent, optionally in a fluidized bed gas phase reactor, connected in series or parallel, and recovering the resulting polymer.

In another process an ethylene /α-olefin interpolymer composition is prepared by:

(A) contacting ethylene and at least one other α-olefin under polymerization conditions in the presence of a catalyst system of the present invention in at least one reactor to produce a first interpolymer or optionally a solution of a first interpolymer, (B) contacting ethylene and at least one other α-olefin under polymerization conditions and at a higher polymerization reaction temperature than used in step (A) in the presence of an addition polymerization catalyst in at least one other reactor to produce a second interpolymer optionally in solution, and (C) combining the first interpolymer and second interpolymer to form an ethylene/α-olefin interpolymer blend composition, and (D) recovering the ethylene/α-olefin interpolymer blend composition.

Preferably the addition polymerization catalyst for step (B) is a heterogeneous Ziegler catalyst comprising:

(i) a solid support component comprising magnesium halide, silica, modified silica, alumina, aluminum phosphate, or a mixture thereof, and (ii) a transition metal component represented by the formula:

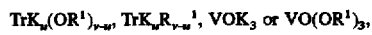

wherein:

Tr is a Group 4, 5, or 6 metal, u is a number from 0 to 6 that is less than or equal to v, v is the formal oxidation number of Tr, $X^2$ is halogen, $R^5$ independently each occurrence is a hydrocarbyl group having from 1 to 20 carbon atoms.

These polymerizations are generally carried out under solution conditions to facilitate the intimate mixing of the two polymer-containing streams. The foregoing technique allows for the preparation of ethylene/α-olefin interpolymer compositions having a broad range of molecular weight distribution and composition distribution. Preferably, the heterogeneous catalyst is also chosen from those catalysts which are capable of efficiently producing the polymers under high temperature, especially, temperatures greater than or equal to 180° C. under solution process conditions.

In a still further embodiment, there is provided a process for preparing an ethylene/α-olefin interpolymer composition, comprising:

(A) polymerizing ethylene and at least one other α-olefin in a solution process under suitable solution polymerization temperatures and pressures in at least one reactor containing a catalyst system of the present invention to produce a first interpolymer solution, (B) passing the interpolymer solution of (A) into at least one other reactor containing an addition polymerization catalyst in the presence of ethylene and optionally one other α-olefin under solution polymerization conditions to form a solution comprising the ethylene/α-olefin interpolymer composition, and (C) recovering the ethylene/α-olefin interpolymer composition.

Preferably the addition polymerization catalyst is a heterogeneous Ziegler catalyst comprising:

(i) a solid support component comprising a magnesium halide or silica, and (ii) a transition metal component represented by the formula:

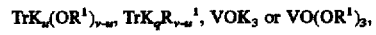

wherein:

Tr, $X^2$, u, v, and $R^5$ are as previously defined.

The foregoing technique also allows for the preparation of ethylene/α-olefin interpolymer compositions having a broad range of molecular weight distributions and composition distributions. Particularly desirable α-olefins for use in the foregoing processes are $C_{4-8}$ α-olefins, most desirably 1-octene.

The skilled artisan will appreciate that the invention disclosed herein may be practiced in the absence of any component which has not been specifically disclosed. The following examples are provided as further illustration thereof and are not to be construed as limiting. Unless stated to the contrary all parts and percentages are expressed on a weight basis.

EXAMPLE 1

Preparation of tris(pentafluorophenyl)borane: diethylamine adduct

A 100 mL glass flask was charged with 0.451 g of tris(pentafluorophenyl)borane (0.881 mmol) and 30 mL of toluene. To this solution 0.300 mL of diethylamine (0.212 g, 2.90 mmol) was added. The solution was then stirred for 30 minutes whereupon the solvent was removed under reduced pressure. The residue was triturated twice with pentane and then evaporated under reduced pressure for 1 hour. A powdery white solid was isolated (412 mg, 80 percent yield).

EXAMPLE 2

Preparation of tris(pentafluorophenyl)borane: ammonia adduct

A 25 mL glass flask was charged with 0.424 g of tris (pentafluorophenyl)borane (0.828 mmol) and attached to a needle valve. The flask was evacuated on a vacuum line and cooled to −78° C. Ammonia (41.1 mmol, 49.6 equiv.) was dried over Na/K and then condensed into the flask during which time a white solid formed. The flask was back filled with argon, the cold bath removed, and the mixture allowed to warm to about 20° C. The solid dissolved upon warming. The solution was evaporated under reduced pressure to give a white sticky solid. The solid was triturated twice with pentane and then evaporated to dryness to give 0.346 g (79 percent yield) of a powdery white solid.

EXAMPLE 3

Preparation of tris(pentafluorophenyl)borane: pentafluoroaniline adduct

A 50 mL glass flask, equipped with a magnetic stir bar was charged with 0.503 g of tris(pentafluorophenyl)borane (0.982 mmol) and 30 mL of mixed hexanes. To this solution was added a solution of 2,3,4,5,6-pentafluoroaniline (0.169 g, 0.994 mmol, 1.01 equiv.) The solution was then stirred for 30 minutes during which time a white precipitate formed. The mixture was concentrated to about 15 mL and filtered. The residue was washed once with mixed hexanes and devolatilized under reduced pressure for 2 hours. A powdery white solid was isolated (1.03 g, 84 percent yield).

EXAMPLE 4

Preparation of tris(pentafluorophenyl)borane: N-methylaniline adduct

A 50 mL glass flask was charged with 1.014 g of tris (pentafluorophenyl)borane (1.98 mmol) and 30 mL of toluene. To this solution 0.22 mL of N-methylaniline (0.212 g, 2.90 mmol) was added. The solution was then stirred for 1 hour and the solvent was removed under reduced pressure leaving a white solid. The residue was triturated twice with mixed hexanes, the resulting mixture filtered and the white solid devolatilized under reduced pressure for 2 hours. A powdery white solid was isolated (1.03 g, 84 percent yield).

Polymerizations

A two liter stirred reactor was charged with about 745 g of mixed alkane solvent (Isopar-E™ available from Exxon Chemicals Inc.) and about 120 g of 1-octene comonomer. The reactor was heated to 140° C. and stirred at 1200 rpm. Hydrogen was added to the reactor by differential pressure expansion from a 80 mL addition tank. The reactor was then saturated with ethylene at 3.5 MPa. The catalyst system was prepared by mixing equimolar quantities of the catalyst and a tris(pentafluorophenyl)borane adduct in a dry box. The catalysts employed were [(N-tert-butylamido)dimethyl (tetramethyl-$\eta^5$-cyclopentadienyl)silane]titaniumdimethyl (Table I) and [(N-tert-butylamido)dimethyl($\eta^5$-tetrahydrofluorenyl)silane]titaniumdimethyl (Table II). The tris(pentafluorophenyl)borane adducts are further identified in Tables I and II. The resulting solution was transferred to a catalyst system addition tank and injected into the reactor. The addition line was washed with 5 mL of toluene and also injected into the reactor. The polymerization was allowed to proceed with ethylene being added on demand. After 15 minutes the polymer solution was removed from the reactor. A hindered phenol antioxidant (Irganox™ 1010 available from Ciba Geigy Corp.), 100 mg, was added to the resulting ethylene/1-octene copolymer. Volatiles were removed from the polymer solution under reduced pressure in an oven at about 130° C. for approximately 18 hours. Reaction conditions and results are contained in Table 1.

TABLE 1

(catalyst - [(N-tert-butylamido)dimethyl(tetramethyl-$\eta^5$-cyclopentadienyl)silane]titaniumdimethyl)

| Run | cocatalyst (μmol) | Solvent (g) | 1-octene (g) | ΔH₂ (kPa) | Exotherm (°C.) | Polymer (g) |
|---|---|---|---|---|---|---|
| 1 | Ex. 1 (2) | 744 | 122 | 193 | 3.9 | 50.5 |
| 2 | " | " | " | " | 3.2 | 41.8 |
| 3 | Ex. 2 (2) | 743 | 123 | 179 | 2.0 | 35.1 |
| 4 | Ex. 3 (2) | 744 | 126 | " | 5.4 | 62.7 |
| 5 | " | " | " | 193 | 6.8 | 72.2 |
| 6 | Ex. 4 (2) | 700 | 142 | 172 | 14.1 | 93.4 |
| 6 | Ex. 4 (1) | 700 | 139 | 179 | 3.1 | 53.3 |

1. $(C_6F_5)_3B \cdot HN(C_2H_5)_2$
2. $(C_6F_5)_3B \cdot NH_3$
3. $(C_6F_5)_3B \cdot H_2N(C_6F_5)$
4. $(C_6F_5)_3B \cdot HN(CH_3)(C_6H_5)$

TABLE II (catalyst - [(N-tert-butylamido)dimethyl($\eta^5$-tetrahydrofluorenyl)silane]titaniumdimethyl)

| Run | cocatalyst (μmol) | Solvent (g) | 1-octene (g) | ΔH₂ (kPa) | Exotherm (°C.) | Polymer (g) |
|---|---|---|---|---|---|---|
| 1 | Ex. 1 (2) | 700 | 138 | 172 | 1.1 | 8.9 |
| 2 | Ex. 3 (2) | " | 135 | " | 1.5 | 17.4 |
| 3 | Ex. 4 (1) | " | 142 | 179 | 2.8 | 32.6 |
| 4 | Ex. 4 (2) | " | " | " | 10.0 | 76.4 |

1. $(C_6F_5)_3B \cdot HN(C_2H_5)_2$
2. $(C_6F_5)_3B \cdot NH_3$
3. $(C_6F_5)_3B \cdot H_2N(C_6F_5)$
4. $(C_6F_5)_3B \cdot HN(CH_3)(C_6H_5)$

What is claimed is:

1. A composition of matter comprising:
   a) at least one metal complex corresponding to the formula:

$$K'_k MZ'_m L_n X_p,$$

or a dimer thereof wherein:
   K' is an anionic group comprising delocalized π-electrons through which K' is bound to M, containing up to 50 nonhydrogen atoms, optionally two K' groups may be joined together forming a bridged structure, and further optionally one K' may be bound to Z';

M is a Group 4 metal in the +2, +3 or +4 formal oxidation state;

Z' is a divalent substituent of up to 50 non-hydrogen atoms that together with K' forms a metallocycle with M;

L is a neutral Lewis base having up to 20 non-hydrogen atoms;

X independently each occurrence is a monovalent, anionic moiety other than a group that is bound to M through delocalized x-electrons, said X having up to 40 non-hydrogen atoms, or two X groups may be covalently bound together forming a divalent dianionic moiety having both valences bound to M, or one or more X and one or more L groups may be bound together thereby forming a moiety that is both covalently bound to M through X and coordinated thereto through L;

k is 1 or 2;
   m is 0 or 1;
   n is a number from 0 to 3;
   p is an integer from 0 to 3; and
   the sum, k+m+p, is equal to the formal oxidation state of M, and b) at least one adduct of a tris(organyl)borane and a non-tertiary amine or non-tertiary phosphine compound corresponding to the formula:

$$(C_f)_3 B \cdot HJG_2,$$

wherein,
   $C_f$ independently each occurrence is a fluorinated hydrocarbyl group,
   B is boron,
   H is hydrogen,
   J is nitrogen or phosphorus, and
   G, independently each occurrence is hydrogen, hydrocarbyl, halogenated hydrocarbyl, silyl, or a mixture thereof, said G having up to 20 nonhydrogen atoms;

the molar ratio of a) to b) being from 1:10,000 to 100:1.

2. A composition according to claim 1 wherein, $C_f$ is pentafluorophenyl, 2,3,5,6-tetrafluorophenyl, 2,3,4,5-tetrafluorophenyl, 3,4,5-trifluorophen- 1 -yl, or 4-(pentafluorophenyl)-2,3,5,6-tetrafluorophenyl.

3. A composition according to claim 1 wherein $C_f$ is pentafluorophenyl.

4. A composition according to claim 1 wherein the metal complex corresponds to the formula:

$$K'_k MZ'_m L_n X_p,$$

or a dimer thereof
wherein:
K' is a cyclic, anionic group comprising delocalized π-electrons through which K' is bound to M, containing up to 50 nonhydrogen atoms;

M is a metal of Group 4 of the Periodic Table of the Elements in the +2, +3 or +4 formal oxidation state;

Z' is a divalent substituent of up to 50 non-hydrogen atoms that together with K' forms a metallocycle with M;

L is a neutral Lewis base ligand having up to 20 non-hydrogen atoms;

X independently each occurrence is a monovalent, anionic moiety other than a group that is bound to M through delocalized π-electrons, said X having up to 30 non-hydrogen atoms, or two X groups may be covalently bound together forming a divalent dianionic moiety having both valences bound to M, or one or more X and one or more L groups may be bound together thereby forming a moiety that is both covalently bound to M through X and coordinated through L;

k is 1 or 2;

m is 0 or 1, and the sum k+m=2;

n is a number from 0 to 3;

p is an integer from 0 to 2; and the sum, k+m+p, is equal to the formal oxidation state of M.

5. A composition according to claim 4 wherein K' is selected from the group consisting of cyclopentadienyl, indenyl, fluorenyl, tetrahydroindenyl, tetrahydrofluorenyl, octahydrofluorenyl, pentadienyl, cyclohexadienyl, dihydroanthracenyl, hexahydroanthracenyl, decahydroanthracenyl, and methyl-substituted derivatives thereof.

6. A composition according to claim 1 wherein the metal complex corresponds to the formula:

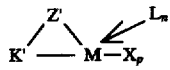

wherein:

K' is a cyclic, anionic, delocalized group comprising π-electrons through which K' is bound to M, containing up to 50 nonhydrogen atoms;

M is a Group 4 metal,

Z' is a divalent substituent of up to 50 non-hydrogen atoms that together with K forms a metallocycle with M;

L is a neutral Lewis base ligand having up to 20 non-hydrogen atoms;

X independently each occurrence is a monovalent, anionic moiety other than a group that is bound to M through delocalized π-electrons, said X having up to 30 non-hydrogen atoms, or two X groups may be covalently bound together forming a divalent dianionic moiety having both valences bound to M, or one or more X and one or more L groups may be joined together thereby forming a moiety that is both covalently bound to M through X and coordinated through L;

n is 0 or 1; and p is an integer from 0 to 2 equal to 2 less than the formal oxidation state of M.

7. A composition according to claim 6 wherein the metal complex corresponds to the formula:

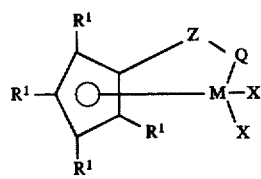

wherein:

M is titanium or zirconium in the +4 formal oxidation state;

$R^1$ each occurrence is independently selected from hydrogen, hydrocarbyl, silyl, germyl, halo, cyano, and combinations thereof, said $R^1$ having up to 20 nonhydrogen atoms, and optionally, two $R^1$ groups are joined together forming a divalent derivative thereof connected to adjacent positions of the cyclopentadienyl ring;

X is hydride, halo, or a hydrocarbyl, hydrocarbyloxy or silyl group, said group having up to 20 nonhydrogen atoms;

Q is —O—, —S—, —NR$^4$—, or —PR$^4$—; and

Z is $SiR_2^4$, $CR_2^4$, $SiR_2^4SiR_2^4$, $CR_2^4CR_2^4$, $CR^4=CR^4$, $CR_2^4SiR_2^4$, or $GeR_2^4$;

wherein:

$R^4$ each occurrence is independently hydrogen, or a member selected from hydrocarbyl, silyl, halogenated alkyl, halogenated aryl, and combinations thereof, said $R^4$ having up to 10 non-hydrogen atoms.

8. A composition according to claim 1 wherein the metal complex corresponds to the formula:

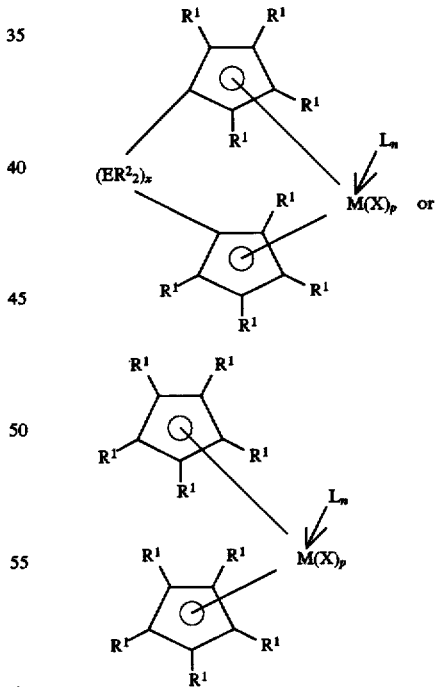

wherein,

M is zirconium or hafnium in the +2 or +4 oxidation state;

$R^2$ independently each occurrence is hydrogen or a group selected from silyl, hydrocarbyl and combinations thereof, said $R^2$ having up to 30 carbon or silicon atoms.

E is silicon or carbon, x is 1 to 8,

L is a neutral Lewis base ligand having up to 20 non-hydrogen atoms;

X groups are selected from hydride, hydrocarbyl, silyl, germyl, halohydrocarbyl, halosilyl, silylhydrocarbyl and aminohydrocarbyl groups, or two X groups together with M form a metallocyclopentene, and p is 2 and n is 0 when M is in the +4 formal oxidation state and p is 0 and n is 1 when M is in the +2 formal oxidation state.

* * * * *

UNITED STATES PATENT AND TRADEMARK OFFICE
CERTIFICATE OF CORRECTION

PATENT NO.    : 5,721,183
DATED         : February 24, 1998
INVENTOR(S)   : David R. Neithamer Page 1 of 3

It is certified that error appears in the above-identified patent and that said Letters Patent is hereby corrected as shown below:

Column 1,
Line 52, "L" should correctly read -- K' --.
Line 54, "K may be bound to Z;" should correctly read -- K' may be bound to Z'; --.
Line 57, "Z" should correctly read -- Z' --.
Line 58, "K" should correctly read -- K' --.
Line 60, "L'" should correctly read -- L --.
Line 63, "n-bonded" should correctly read -- π-bonded --.

Column 2,
Line 1, the first occurrence of "L" should correctly read -- X --.
Line 16, "$(C_f)_3B \cdot HJG_2$," should correctly read -- $(Cf)_3B \cdot HJG_2$, --.
Line 19, "Pf" should correctly read -- Cf --.
Line 49, "Pf" should correctly read -- Cf --.

Column 3,
Line 9, "K" should correctly read -- K' --.
Line 10, "n-electron" should correctly read -- π-electron --.
Line 16, "n-bonded" should correctly read -- π-bonded --.
Line 17, "n-bonded" should correctly read -- π-bonded --.
Line 40, "K" should correctly read -- K' --.
Line 41, "K" should correctly read -- K' --.
Line 42, "$(ER_2)_x$," should correctly read -- $(ER^2_2)_x$ --.
Line 47, "R'" should correctly read -- $R^2$ --.

Column 4,
Line 8, "K" should correctly read -- K' --.
Line 9, "K" should correctly read -- K' --.
Line 23, "L'" should correctly read -- L --.
Line 49, "K" should correctly read -- K' --.
Line 54, "Z" should correctly read -- Z' --.
Line 55, "K" should correctly read -- K' --.
Line 59, "n-bonded" should correctly read -- π-bonded --.
Line 64, "may be together" should correctly read -- may be bound together --.

UNITED STATES PATENT AND TRADEMARK OFFICE
CERTIFICATE OF CORRECTION

PATENT NO.    : 5,721,183
DATED         : February 24, 1998
INVENTOR(S)   : David R. Neithamer It is certified that error appears in the above-identified patent and that said Letters Patent is hereby corrected as shown below:

Column 5,
Line 10, "n-bonded" should correctly read -- $\pi$-bonded --.
Line 18, "K" should correctly read -- K' --.
Line 21, "Z" should correctly read -- Z' --.
Line 22, "K" should correctly read -- K' --.
Line 27, "n-bonded" should correctly read -- $\pi$-bonded --.
Line 32, "may be together" should correctly read -- may be bound together --.
Line 55, "X" should correctly read -- Z' --.
Line 56, "K" should correctly read -- K' --.
Line 59, "$R^2$" should correctly read -- $R^1$ --.
Line 66, "n-bonded" should correctly read -- $\pi$-bonded --.

Column 6,
Line 4, "X'''" should correctly read -- X --.
Line 32, "X'''" should correctly read -- X --.
Lines 35, and 36, $Sir_2^4 SiR_2^4$, $CR_2^4 CR_2^4$, $CR^4=CR^4$, $CR_2^4 SiR_2^4$, or $GeR_2^4$" should correctly read -- $SiR_2^4 SiR_2^4$, $CR_2^4 CR_2^4$, $CR^4=CR^4$, $CR_2^4 SiR_2^4$, or $GeR_2^4$ --.
Line 52, "$C_5R_4^1$" should read correctly read -- $C_5R_4^1$ --.
Line 62, "R''''" should correctly read -- $R^3$ --.
Line 65, "$C_5R_4^1$" should correctly read -- $C_5R_4^1$ --.

Column 7,
Line 4, "X'''" should correctly read -- X --.

Column 8,
Line 50, "L" should correctly read -- K' --.

Column 9,
Line 23, "L'" should correctly read -- L --.
Line 25, "X'''" should correctly read -- X --.
Line 27, "X'''" should correctly read -- X --.

Column 10,
Line 25, "$10^{12}$:1 should correctly read -- $10^{-12}$:1 --.

UNITED STATES PATENT AND TRADEMARK OFFICE
CERTIFICATE OF CORRECTION

PATENT NO. : 5,721,183
DATED : February 24, 1998
INVENTOR(S) : David R. Neithamer It is certified that error appears in the above-identified patent and that said Letters Patent is hereby corrected as shown below:

Column 11,
Line 20, $TrK_u(OR^1)_{v-u}$, $TrK_uR^1_{v-u}$, $VOK_3$ or $VO(OR^1)_3$" should correctly read -- $TrX'_u(OR^5)_{v-u}$, $TrX'_uR^5_{v-u}$, $VOX'_3$ or $VO(OR^5)_3$ --.
Line 26, "$X^2$" should correctly read -- $X'$ --.
Line 62, , $TrK_u(OR^1)_{v-u}$, $TrK_uR^1_{v-u}$, $VOK_3$ or $VO(OR^1)_3$" should correctly read -- $TrX'_u(OR^5)_{v-u}$, $TrX'_uR^5_{v-u}$, $VOX'_3$ or $VO(OR^5)_3$ --.

Column 13,
Table 1, footers 1, 3, and 4, "B.H" should correctly read -- B·H --.
Table 1, footer 2, "B.N" should correctly read -- B·N --
Table 2, footers 1, 3, and 4, "B.H" should correctly read -- B·H --.
Table 2, footer 2, "B.N" should correctly read -- B·N --.

Column 14,
Line 38, $(C_f)_3B\ HJG_2'$" should correctly read -- $(C_f)_3B·HGJ_2'$ --.

Column 16,
Lines 24, and 25, $SIR_2^4$, $CR_2^4$, $SiR_2^4SiR_2^4$, $CR_2^4CR_2^4$, $CR^4={}^{CR4}$, $CR_2^4SiR_2^4$, or $GeR_2^4$" should correctly read -- $SIR^4_2$, $CR^4_2$, $SiR^4_2SiR^4_2$, $CR^4_2CR^4_2$, $CR^4={}^{CR4}$, $CR^4_2SiR^4_2$, or $GeR^4_2$"

Signed and Sealed this

Twenty-first Day of August, 2001

Attest:

NICHOLAS P. GODICI
Attesting Officer   Acting Director of the United States Patent and Trademark Office